United States Patent
Chozui (10) Patent No.: US 8,443,399 B2
(45) Date of Patent: May 14, 2013

(54) DIGITAL BROADCAST RECEIVER AND DIGITAL BROADCAST TRANSMITTER

(75) Inventor: Sadatoshi Chozui, Osaka (JP)

(73) Assignee: Panasonic Corporation, Osaka (JP)

( * ) Notice: Subject to any disclaimer, the term of this patent is extended or adjusted under 35 U.S.C. 154(b) by 36 days.

(21) Appl. No.: 13/320,779

(22) PCT Filed: Jun. 2, 2010

(86) PCT No.: PCT/JP2010/003675
§ 371 (c)(1),
(2), (4) Date: Nov. 16, 2011

(87) PCT Pub. No.: WO2010/140354
PCT Pub. Date: Dec. 9, 2010

(65) Prior Publication Data
US 2012/0060193 A1 Mar. 8, 2012

(30) Foreign Application Priority Data
Jun. 2, 2009 (JP) .................................. 2009-132818

(51) Int. Cl.
G06F 3/00 (2006.01)
G06F 13/00 (2006.01)
H04N 5/445 (2011.01)

(52) U.S. Cl.
USPC ................... 725/54; 725/39; 725/48; 725/49; 725/59

(58) Field of Classification Search .................... 725/39, 725/48–49, 54, 58–59, 90, 134, 142
See application file for complete search history.

(56) References Cited

U.S. PATENT DOCUMENTS

| 5,808,694 | A | 9/1998 | Usui et al. |
| 6,037,998 | A | 3/2000 | Usui et al. |
| 6,075,570 | A | 6/2000 | Usui et al. |
| 6,219,839 | B1* | 4/2001 | Sampsell ......................... 725/40 |
| 6,305,018 | B1 | 10/2001 | Usui et al. |

(Continued)

FOREIGN PATENT DOCUMENTS

| JP | 8-275077 | 10/1996 |
| JP | 2001-008119 | 1/2001 |

(Continued)

OTHER PUBLICATIONS

International Search Report issued Aug. 24, 2010 in International (PCT) Application No. PCT/JP2010/003675.

*Primary Examiner* — Jason Salce
*Assistant Examiner* — Gigi L Dubasky
(74) *Attorney, Agent, or Firm* — Wenderoth, Lind & Ponack, L.L.P.

(57) ABSTRACT

A digital broadcast transmitter includes a first de-multiplexing unit for separating video/audio data and real-time broadcast program information from a transport stream when a digital broadcast signal carries the transport stream; a first storage unit for storing the real-time broadcast program information; a second de-multiplexing unit for separating video/audio data and download broadcast content information from a download broadcast signal when the digital broadcast signal carries the download broadcast signal; a second storage unit for storing the download broadcast content information; a program guide generating unit for converting the download broadcast content information stored in the second storage unit into the real-time broadcast program information, forming electronic program guide display data together with the real-time broadcast program information stored in the first storage unit, and outputting the formed data.

4 Claims, 9 Drawing Sheets

U.S. PATENT DOCUMENTS

| | | |
|---|---|---|
| 2003/0093795 A1 | 5/2003 | Takahashi et al. |
| 2004/0158856 A1* | 8/2004 | Grooters et al. ............... 725/39 |
| 2005/0144644 A1* | 6/2005 | Hirota ............................ 725/90 |
| 2007/0074249 A1* | 3/2007 | Byun et al. .................... 725/39 |
| 2008/0163307 A1* | 7/2008 | Coburn et al. ................. 725/61 |
| 2008/0244645 A1* | 10/2008 | Moon et al. ................... 725/37 |
| 2009/0144777 A1* | 6/2009 | Mikami et al. ................ 725/50 |
| 2010/0223642 A1* | 9/2010 | Knudson et al. .............. 725/41 |
| 2010/0287588 A1* | 11/2010 | Cox et al. ...................... 725/40 |
| 2012/0317601 A1* | 12/2012 | Hong et al. .................... 725/40 |

FOREIGN PATENT DOCUMENTS

| | | |
|---|---|---|
| JP | 2002-369093 | 12/2002 |
| JP | 2003-199009 | 7/2003 |
| JP | 2005-051613 | 2/2005 |
| JP | 2005-191950 | 7/2005 |
| JP | 2008-199345 | 8/2008 |

* cited by examiner

|  | CH001 | CH002 | CH003 |
|---|---|---|---|
| 20:00 | News | Movie | Movie |
|  | Drama |  | Movie |
| 21:00 | Drama |  | Documentary |
|  | Special |  |  |
|  | Sports |  |  |
| 22:00 | Sports relay broadcasting | (No information) | Variety |

|  | CH001 | CH002 | CH003 |
|---|---|---|---|
| 20:00 | News | Movie | Download broadcast service |
|  | Drama | | |
| 21:00 | Download broadcast service | | Documentary |
| 22:00 | Sports relay broadcasting | (No information) | Variety |

FIG. 6

FIG. 7 – PRIOR

FIG. 8 – PRIOR ART

| Download broadcast content information | Real-time broadcast program information |
|---|---|
| Address map information<br>· Channel number  001<br>· Sender address  12.34.56.78 | |
| Content information 1<br>· Sender address  12.34.56.78<br>· Content ID  1000<br>· Delivery date  May 20, 21:00<br>  and time 1<br>· Duration 1  00:10<br>· Content name  Drama | Program information 1<br>· Channel number  001<br>· Program ID  1000<br>· Starting time  May 20, 21:00<br>  and date<br>· Duration  00:10<br>· Program name  Drama |
| Content information 2<br>· Sender address  12.34.56.78<br>· Content ID  1001<br>· Delivery date  May 20, 21:10<br>  and time 1<br>· Duration 1  00:30<br>· Delivery date  May 21, 21:10<br>  and time 2<br>· Duration 2  00:30<br>· Content name  Special | Program information 2<br>· Channel number  001<br>· Program ID  1001<br>· Starting time  May 20, 21:10<br>  and date<br>· Duration  00:30<br>· Program name  Special |
| Content information 3<br>· Sender address  12.34.56.78<br>· Content ID  1002<br>· Delivery date  May 20, 21:40<br>  and time 1<br>· Duration 1  00:20<br>· Content name  Sports | Program information 3<br>· Channel number  001<br>· Program ID  1002<br>· Starting time  May 20, 21:40<br>  and date<br>· Duration  00:20<br>· Program name  Sports |

FIG. 9 – PRIOR ART

|       | CH001 | CH002 | CH003 |
|-------|-------|-------|-------|
| 20:00 | News  | Movie | (No information) |
|       | Drama |       |       |
| 21:00 | (No information) |  | Documentary |
| 22:00 | Sports relay broadcasting | (No information) | Variety |

FIG. 10 – PRIOR ART

|       | CH001 | CH002 | CH003 |
|-------|-------|-------|-------|
| 20:00 | (No information) | (No information) | Movie |
|       |       |       | Movie |
| 21:00 | Drama |       |       |
|       | Special |     | (No information) |
|       | Sports |      |       |
| 22:00 | (No information) |  |       |

DIGITAL BROADCAST RECEIVER AND DIGITAL BROADCAST TRANSMITTER

This application is a U.S. National phase application of PCT International Application PCT/JP2010/003675, filed Jun. 2, 2010.

TECHNICAL FIELD

The present invention relates to a digital broadcast receiver and a digital broadcast transmitter for simultaneously displaying programs and information of content corresponding to both real-time broadcast service and download broadcast service.

BACKGROUND ART

Digital broadcast service includes the real-time broadcast service intended to be viewed in real time as ordinary television broadcast service, and the download broadcast service intended to be stored in a receiver once and then to be reproduced and viewed. The download broadcast service cannot be viewed in real time, but it can be operated as a service capable of storing programs with a high transmission rate for a shorter time than being usually viewed. Furthermore, broadcast service can be carried out by switching the two types of broadcast service in terms of time. For example, a mixed operation is possible in which the real-time broadcast service is carried out during the daytime and the download broadcast service of programs whose audience ratings are high in that day is carried out at midnight.

Figure 7:
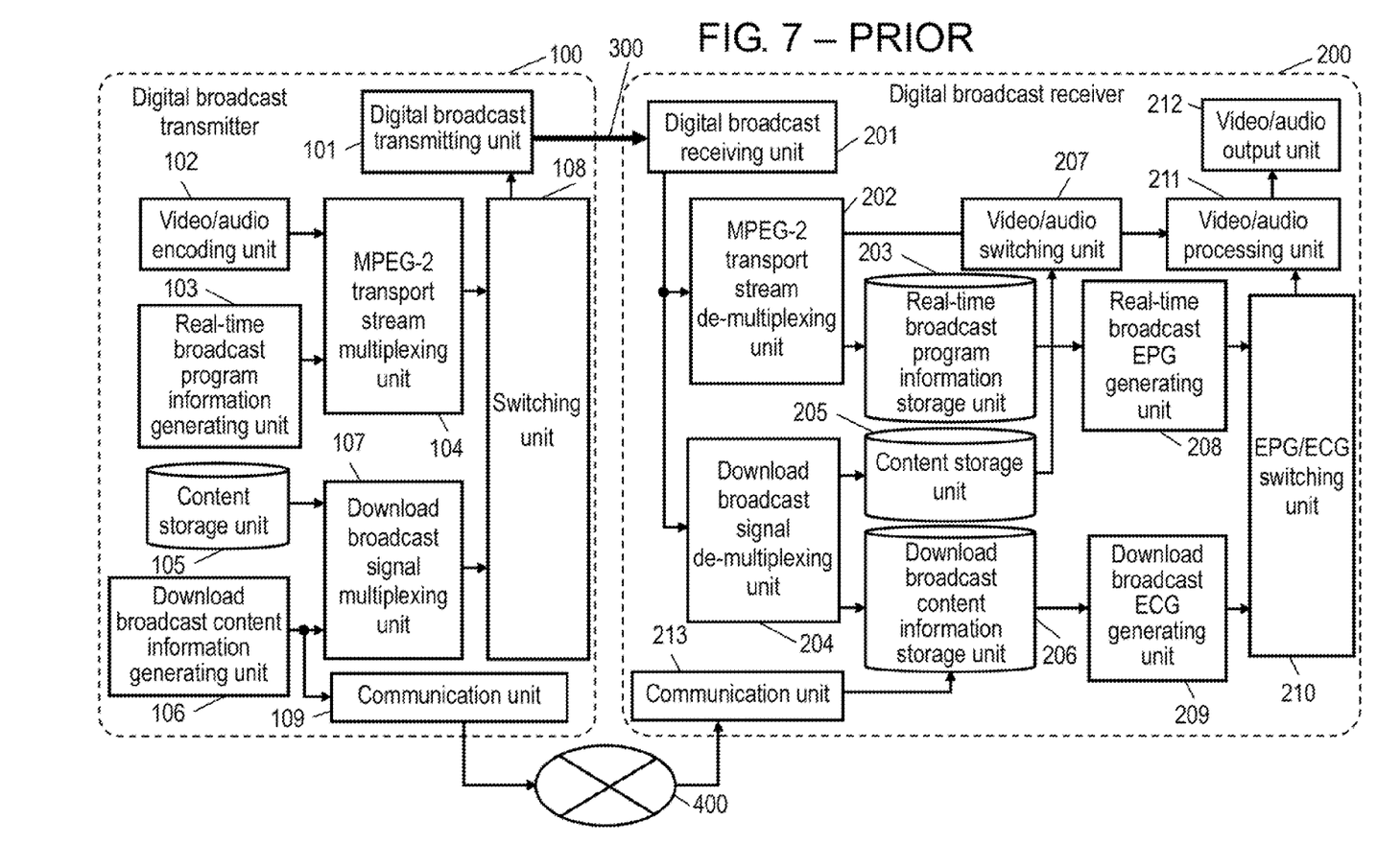
FIG. 7 is a configuration diagram of a conventional digital broadcast system.

FIG. 7 shows a configuration of a digital broadcast system including a digital broadcast transmitter that carries out the mixed operation and a conventional digital broadcast receiver corresponding to the mixed operation.

In digital broadcast transmitter 100, for the real-time broadcast service, MPEG-2 transport stream multiplexing unit 104 multiplexes video/audio data output from video/audio encoding unit 102 and real-time broadcast program information output from real-time broadcast program information generating unit 103 in the MPEG-2 SYSTEM mode. MPEG-2 transport stream multiplexing unit 104 outputs an MPEG-2 transport stream to switching unit 108.

On the other hand, for the download broadcast service, download broadcast signal multiplexing unit 107 multiplexes video/audio data for the download broadcast service, which is output from content storage unit 105, and download broadcast content information output from download broadcast content information generating unit 106 in a download broadcast signal multiplexing mode. Download broadcast signal multiplexing unit 107 outputs a download broadcast signal to switching unit 108. As the download broadcast signal multiplexing mode at this time, a multiplexing mode by a variable-length packet is used with the consideration of the transmission efficiency. For example, in the Advanced BS Digital Broadcast in Japan, as the download broadcast signal multiplexing mode, the TLV (Type Length Value) multiplexing mode is used, and the download broadcast signal is referred to as a TLV stream.

Switching unit 108 selects the MPEG-2 transport stream during the real-time broadcast service. Switching unit 108 selects the download broadcast signal during the download broadcast service. Digital broadcast transmitting unit 101 modulates the selected signal into a digital broadcast signal and outputs the modulated signal to transmission line 300.

When broadcast service is carried out by switching two types of broadcast service in terms of time, the real-time broadcast program information is broadcasted only during the real-time broadcast service, and the download broadcast content information is broadcasted only during the download broadcast service. Therefore, digital broadcast receiver 200 sometimes cannot obtain the real-time broadcast program information or the download broadcast content information in specific timing.

In order to solve this problem, the download broadcast content information output from download broadcast content information generating unit 106 is also output to communication network 400 through communication unit 109. Thus, even during the real-time broadcast service, digital broadcast receiver 200 can obtain the download broadcast content information.

On the other hand, digital broadcast receiver 200 receives the digital broadcast signal flowing in transmission line 300. Digital broadcast receiving unit 201 demodulates the digital broadcast signal. Then, digital broadcast receiving unit 201 outputs the MPEG2 transport stream to MPEG-2 transport stream de-multiplexing unit 202 during real-time broadcast. Furthermore, digital broadcast receiving unit 201 outputs the download broadcast signal to download broadcast signal de-multiplexing unit 204 during download broadcast.

For the real-time broadcast service, MPEG-2 transport stream de-multiplexing unit 202 separates video/audio data and real-time broadcast program information from the MPEG-2 transport stream. The real-time broadcast program information is stored in real-time broadcast program information storage unit 203. The video/audio data pass through video/audio switching unit 207, decoded in video/audio processing unit 211, and are output from video/audio output unit 212, so that a viewer views the real-time broadcast service.

For the download broadcast service, download broadcast signal de-multiplexing unit 204 separates video/audio data and download broadcast content information from the download broadcast signal. Furthermore, during the real-time broadcast service, communication unit 213 obtains the download broadcast content information flowing in communication network 400. The download broadcast content information obtained from transmission line 300 or communication network 400 is stored in download broadcast content information storage unit 206. The video/audio data are stored in content storage unit 205 only when they are programs instructed to be stored by a viewer. The stored video/audio data are output from content storage unit 205 when a viewer instructs reproduction. Then, the video/audio data pass through video/audio switching unit 207, are decoded in video/audio processing unit 211, and are output from video/audio output unit 212. Thus, a viewer can view the download broadcast service.

When a viewer instructs an electronic program guide (hereinafter, abbreviated as "EPG") of the real-time broadcast service to be displayed, real-time broadcast EPG generating unit 208 takes out the real-time broadcast program information from real-time broadcast program information storage unit 203, forms EPG display data, and outputs the formed data. The EPG display data pass through EPG/ECG (Electronic Content Guide) switching unit 210, are synthesized with video data in video/audio processing unit 211, and output from video/audio output unit 212.

Furthermore, when a viewer instructs an electronic content guide (hereinafter, abbreviated as "ECG") of the download broadcast service to be displayed, download broadcast ECG generating unit 209 takes out the download broadcast content information from download broadcast content information storage unit 206, forms ECG display data and outputs the formed data. The ECG display data pass through EPG/ECG switching unit 210, are synthesized with video data in video/audio processing unit 211, and are output from video/audio output unit 212.

The real-time broadcast service and the download broadcast service use utterly different multiplexing modes. For the download broadcast content information, a mode different from EIT (Event Information Table) and the like which is usually used in the real-time broadcast service is used. Therefore, in a conventional digital broadcast system, these two broadcast services are distinguished from each other as individual services. More specifically, the digital broadcast transmitter broadcasts only real-time broadcast program information in the real-time broadcast service, and broadcasts only download broadcast content information in the download broadcast service. In the digital broadcast receiver, the EPG for the real-time broadcast service is displayed on a screen by using only the real-time broadcast program information, and the ECG for the download broadcast service is displayed on a screen by using only the download broadcast content information. The EPG and the ECG are displayed on different screens.

Figure 8:
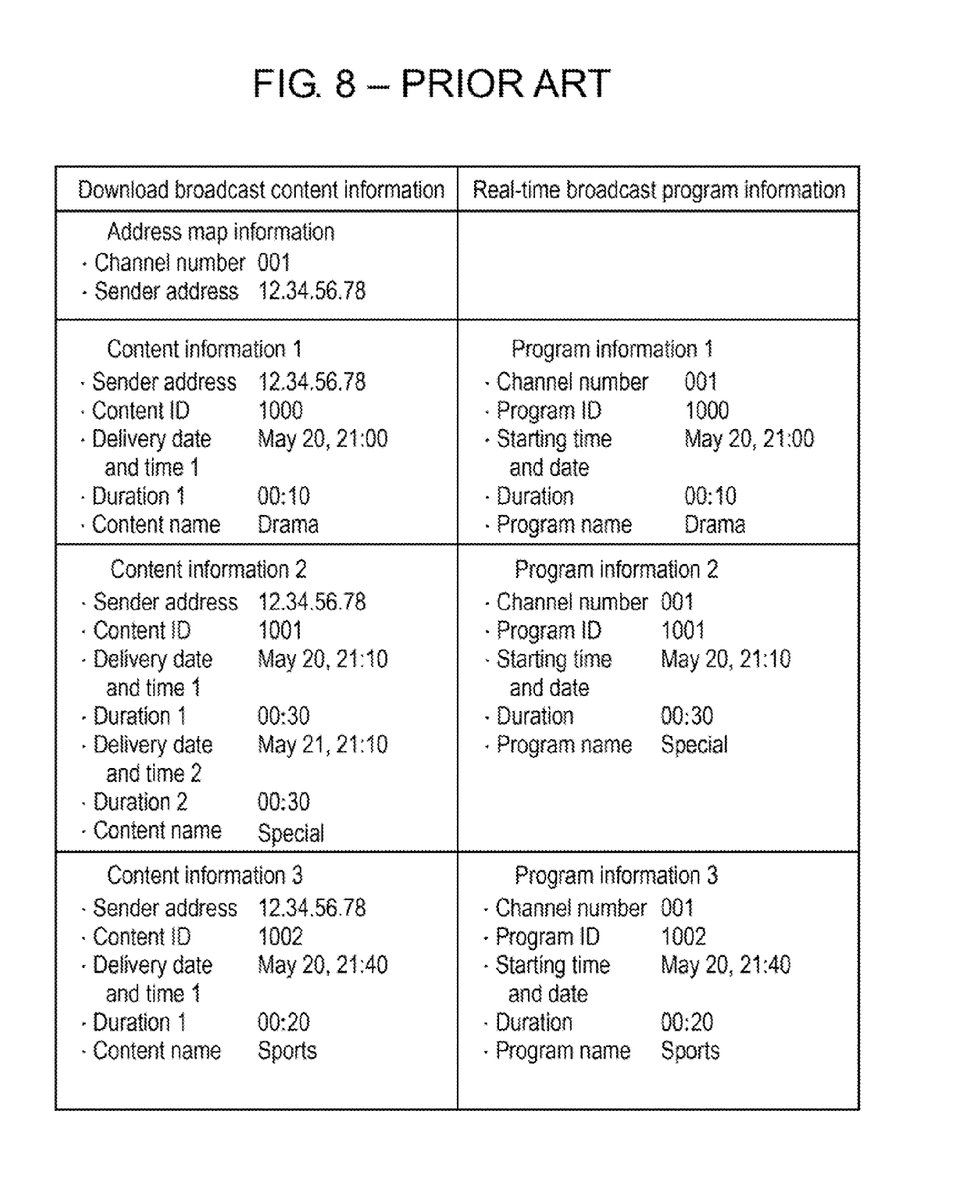
FIG. 8 shows an example of conventional download broadcast content information and real-time broadcast program information.
Figure 9:
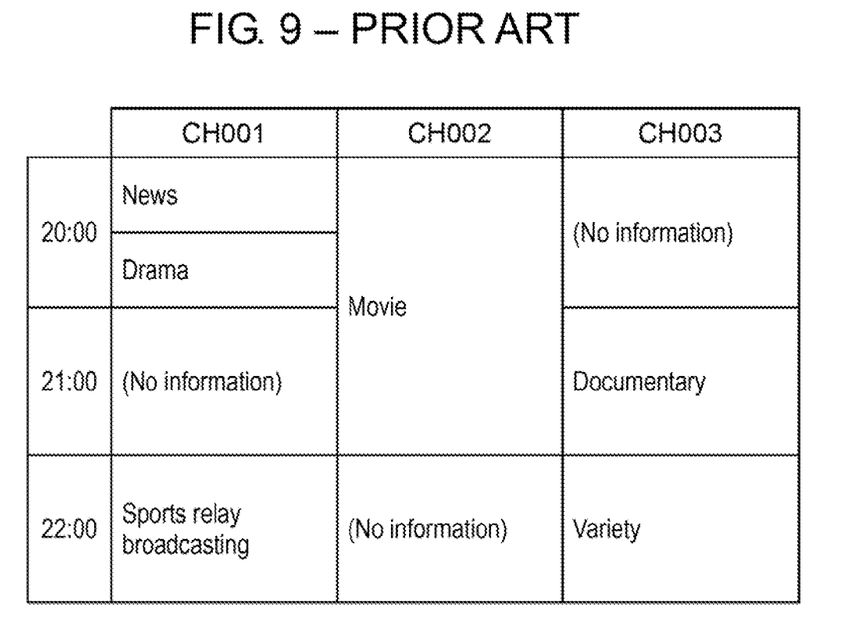
FIG. 9 shows an example of EPG display data in the conventional digital broadcast system.
Figure 10:
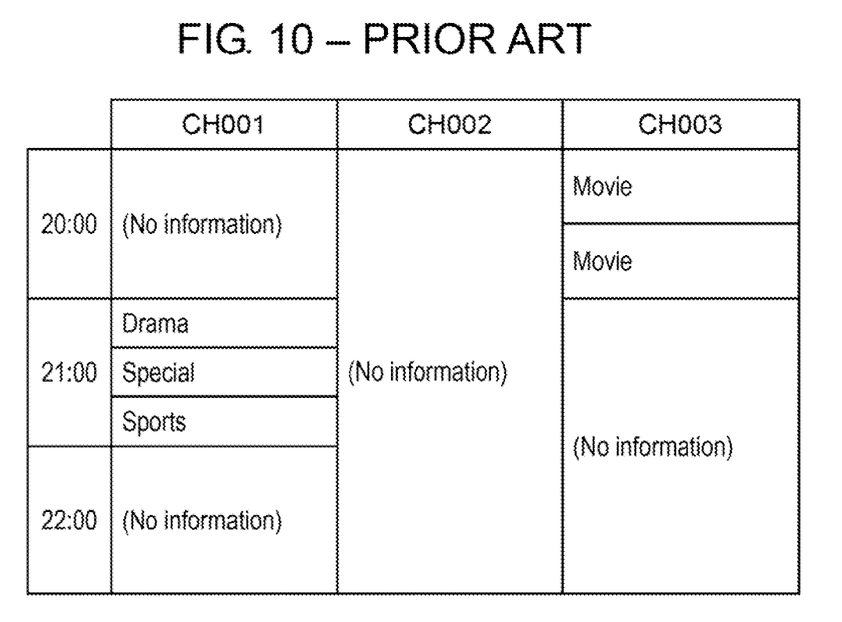
FIG. 10 shows an example of ECG display data in the conventional digital broadcast system.

The download broadcast content information and the real-time broadcast program information are described in detail. FIG. 8 shows examples of conventional download broadcast content information and real-time broadcast program information, FIG. 9 shows an example of EPG display data in a conventional digital broadcast system, and FIG. 10 shows an example of ECG display data in a conventional digital broadcast system.

The download broadcast service uses download broadcast content information that is the same as content information in a communication download service so that the download broadcast service is compatible with the communication download service. Therefore, the download broadcast content information includes a sender address, content ID, and a content name of each content as shown in the left column of FIG. 8. Furthermore, a delivery date and time, and duration are also included as information that is not included in the content information of the communication download service. Furthermore, as shown in content information 2 in FIG. 8, a plurality of delivery dates and times, and duration including those of rebroadcast may be described in one piece of the content information.

Furthermore, as information specific to the download broadcast service, address map information indicating a combination of a channel number and a sender address is also used. Furthermore, the real-time broadcast program information includes program information indicating a channel number, program ID, starting date and time, duration, and a program name of each program as shown in the right column of FIG. 8. In this way, since the information included in the download broadcast content information is different from that included in the real-time broadcast program information, it was necessary to use them separately. From the above description, since an EPG screen uses only the real-time broadcast program information, the screen is displayed in a state in which a time zone of the download broadcast service is blank as shown in FIG. 9. Furthermore, since an ECG screen uses only the download broadcast content information, the screen is displayed in a state in which a time zone of the real-time broadcast service is blank as shown in FIG. 10.

One example of a conventional digital broadcast system is a digital broadcast receiver capable of converting a display form of an EPG according to the conditions provided by a viewer (see, for example, Patent Literature 1).

Another example is a digital broadcast receiver which obtains predetermined program information by using another communication means when it is determined that obtaining of the predetermined program information has not been completed (see, for example, Patent Literature 2).

A still another example shows that program information to which information indicating whether a program requires a storage function at a receiver is added is broadcasted from a digital broadcast transmitter, in which the program information is displayed in such a manner that is distinguished from the other information on an EPG of the digital receiver. (See, for example, Patent Literature 3).

However, in the above-mentioned conventional digital broadcast system, when the real-time broadcast service and the download broadcast service are switched from each other in terms of time and broadcasted, the real-time broadcast program information includes only program information of the real-time broadcast service. Therefore, since no program information for the download broadcast service is included, a time zone of the download broadcast is blank on the EPG screen.

In the digital broadcast system described in Patent Literature 1, a digital broadcast receiver is provided with means for converting display forms of the EPG according to the conditions provided by a viewer. However, program information to be used at that time is only the program information of the real-time broadcast service. Therefore, similarly, a time zone of the download broadcast service in which program information does not originally included is blank on the EPG screen.

In the digital broadcast system described in Patent Literature 2, a digital broadcast receiver is provided with means for obtaining real-time broadcast program information, which has not been obtained, by using another communication means. However, since program information to be used at that time is only program information of the real-time broadcast service, a time zone of the download broadcast service in which program information does not originally included is blank on the EPG screen, which is similar to the above.

The digital broadcast system described in Patent Literature 3 provides means for displaying an EPG with information for distinguishing information added in program information when the real-time broadcast service and the download broadcast service are mixed by using the same multiplexing mode. However, this assumes that two pieces of broadcast program information are multiplexed in the same multiplexing mode. Consequently, when the download broadcast service whose multiplexing mode is different is mixed, a time zone of the download broadcast service in which no program information is included is similarly blank on the EPG screen.

Therefore, by only watching the EPG screen, a viewer cannot discriminate whether the time zone in which the EPG screen is blank signifies suspension of broadcast or during download broadcast.

CITATION LIST

Patent Literature

PTL 1: Japanese Patent Unexamined Publication No. 2002-369093
PTL 2: Japanese Patent Unexamined Publication No. 2005-051613
PTL 3: Japanese Patent Unexamined Publication No. 2005-191950

SUMMARY OF THE INVENTION

A digital broadcast receiver of the present invention includes a digital broadcast receiving unit, a first de-multiplexing unit, a first storage unit, a second de-multiplexing unit, a second storage unit, and a program guide generating unit. The digital broadcast receiving unit receives and demodulates a digital broadcast signal. The first de-multiplexing unit separates video/audio data and real-time broadcast program information from a transport stream when the digital broadcast signal carries the transport stream. The first storage unit stores the real-time broadcast program information. The second de-multiplexing unit separates video/audio data and download broadcast content information from a download broadcast signal when the digital broadcast signal carries the download broadcast signal. The second storage unit stores the download broadcast content information. The program guide generating unit converts the download broadcast content information stored in the second storage unit into the real-time broadcast program information, forms EPG display data together with the real-time broadcast program information stored in the first storage unit, and outputs the formed data.

With such a configuration, the real-time broadcast program information and the download broadcast content information can be displayed simultaneously.

A digital broadcast transmitter of the present invention includes a video/audio encoding unit, a real-time broadcast program information generating unit, a first multiplexing unit, a content storage unit, a download broadcast content information generating unit, a second multiplexing unit, a switching unit, and a digital broadcast transmitting unit. The video/audio encoding unit encodes video/audio data for the real-time broadcast service. The real-time broadcast program information generating unit generates real-time broadcast program information. The first multiplexing unit multiplexes the video/audio data for the real-time broadcast service and the real-time broadcast program information. The content storage unit stores video/audio data for the download broadcast service. The download broadcast content information generating unit generates download broadcast content information. The second multiplexing unit multiplexes the video/audio data for the download broadcast service and the download broadcast content information. The switching unit selects a signal from the first multiplexing unit and a signal from the second multiplexing unit. The digital broadcast transmitting unit modulates a signal selected by the switching unit and outputs the selected signal. The real-time broadcast program information generating unit converts the download broadcast content information from the download broadcast content information generating unit into the real-time broadcast program information, and the real-time broadcast program information generating unit synthesizes the converted real-time broadcast program information with the real-time broadcast program information.

With such a configuration, the real-time broadcast program information and the download broadcast content information can be displayed simultaneously.

DESCRIPTION OF EMBODIMENTS

First Exemplary Embodiment

Hereinafter, the exemplary embodiments of the present invention are described with reference to drawings.

Figure 1:
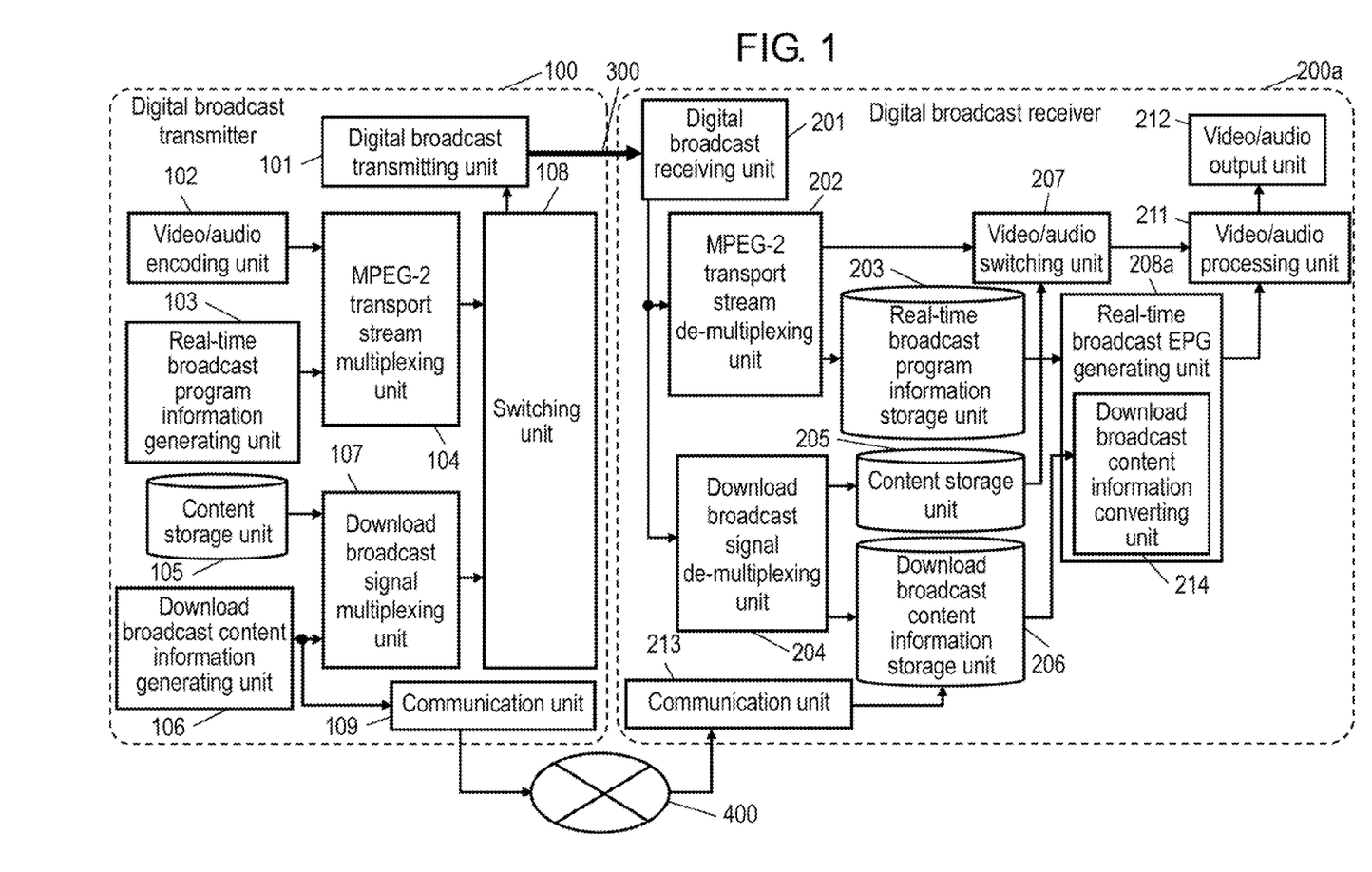
FIG. 1 is a configuration diagram of a digital broadcast system in accordance with a first exemplary embodiment of the present invention.

Firstly, an outline of a digital broadcast system in accordance with a first exemplary embodiment of the present invention is described. FIG. 1 is a configuration diagram of a digital broadcast system in accordance with the first exemplary embodiment of the present invention. Digital broadcast receiver 200*a* is different from digital broadcast receiver 200 of a conventional digital broadcast system shown in FIG. 7, but digital broadcast transmitter 100 is the same as digital broadcast transmitter 100 of the conventional digital broadcast system shown in FIG. 7.

In digital broadcast transmitter 100, for the real-time broadcast service, MPEG-2 transport stream multiplexing unit 104 multiplexes video/audio data output from video/audio encoding unit 102 and real-time broadcast program information output from real-time broadcast program information generating unit 103 in the MPEG-2 SYSTEM mode. MPEG-2 transport stream multiplexing unit 104 outputs an MPEG-2 transport stream to switching unit 108.

On the other hand, for the download broadcast service, download broadcast signal multiplexing unit 107 multiplexes video/audio data for the download broadcast service, which is output from content storage unit 105, and download broadcast content information output from download broadcast content information generating unit 106 in a download broadcast signal multiplexing mode. Download broadcast signal multiplexing unit 107 outputs a download broadcast signal to switching unit 108. As the download broadcast signal multiplexing mode at this time, a multiplexing mode by a variable-length packet is used with the consideration of the transmission efficiency. For example, in the Advanced BS Digital Broadcast in Japan, as the download broadcast signal multiplexing mode, the TLV (Type Length Value) multiplexing mode is used, and the download broadcast signal is referred to as a TLV stream.

Switching unit 108 selects the MPEG-2 transport stream during the real-time broadcast service. Switching unit 108 selects the download broadcast signal during the download broadcast service. Digital broadcast transmitting unit 101 modulates the selected signal into a digital broadcast signal and outputs the modulated signal to transmission line 300.

Furthermore, communication unit 109 outputs the download broadcast content information, which is output from download broadcast content information generating unit 106, to communication network 400.

On the other hand, digital broadcast receiver 200a includes digital broadcast receiving unit 201, a first de-multiplexing unit, a first storage unit, a second de-multiplexing unit, a second storage unit, and a program guide generating unit.

Digital broadcast receiving unit 201 receives the digital broadcast signal flowing in transmission line 300. That is to say, digital broadcast receiving unit 201 receives and demodulates the digital broadcast signal. Digital broadcast receiving unit 201 outputs the MPEG2 transport stream to MPEG-2 transport stream de-multiplexing unit 202 during the real-time broadcast service. Furthermore, digital broadcast receiving unit 201 outputs a download broadcast signal to download broadcast signal de-multiplexing unit 204 during the download broadcast service.

For the real-time broadcast service, that is to say, when the digital broadcast signal carries a transport stream, MPEG-2 transport stream de-multiplexing unit 202 as the first de-multiplexing unit separates video/audio data and real-time broadcast program information from the MPEG-2 transport stream.

Real-time broadcast program information storage unit 203 as the first storage unit stores the real-time broadcast program information. The video/audio data pass through video/audio switching unit 207, are decoded in video/audio processing unit 211, and output from video/audio output unit 212. Thus, a viewer can view real-time broadcast.

For the download broadcast service, that is to say, when the digital broadcast signal carries a download broadcast signal, download broadcast signal de-multiplexing unit 204 as the second de-multiplexing unit separates video/audio data and download broadcast content information from the download broadcast signal. Furthermore, during the real-time broadcast service, the download broadcast content information flowing in communication network 400 is obtained by communication unit 213. Download broadcast content information storage unit 206 as the second storage unit stores the download broadcast content information obtained from transmission line 300 or communication network 400. The video/audio data are stored in content storage unit 205 only when they are programs instructed to be stored by a viewer. The stored video/audio data are output from content storage unit 205 when a viewer instructs reproduction of the data. Then, the video/audio data pass through video/audio switching unit 207, are decoded in video/audio processing unit 211, and output from video/audio output unit 212. Thus, a viewer can view download broadcast.

When a viewer instructs an EPG of the real-time broadcast service to be displayed, real-time broadcast EPG generating unit 208a as a program guide generating unit takes out the download broadcast content information stored in download broadcast content information storage unit 206. Then, download broadcast content information converting unit 214 converts the download broadcast content information into the real-time broadcast program information. Furthermore, real-time broadcast EPG generating unit 208a takes out the real-time broadcast program information from real-time broadcast program information storage unit 203, forms EPG display data together with the converted real-time broadcast program information of the download broadcast content information, and outputs the formed data. The EPG display data are synthesized with the video data in video/audio processing unit 211, and the synthesized data are output from video/audio output unit 212.

Figure 2:
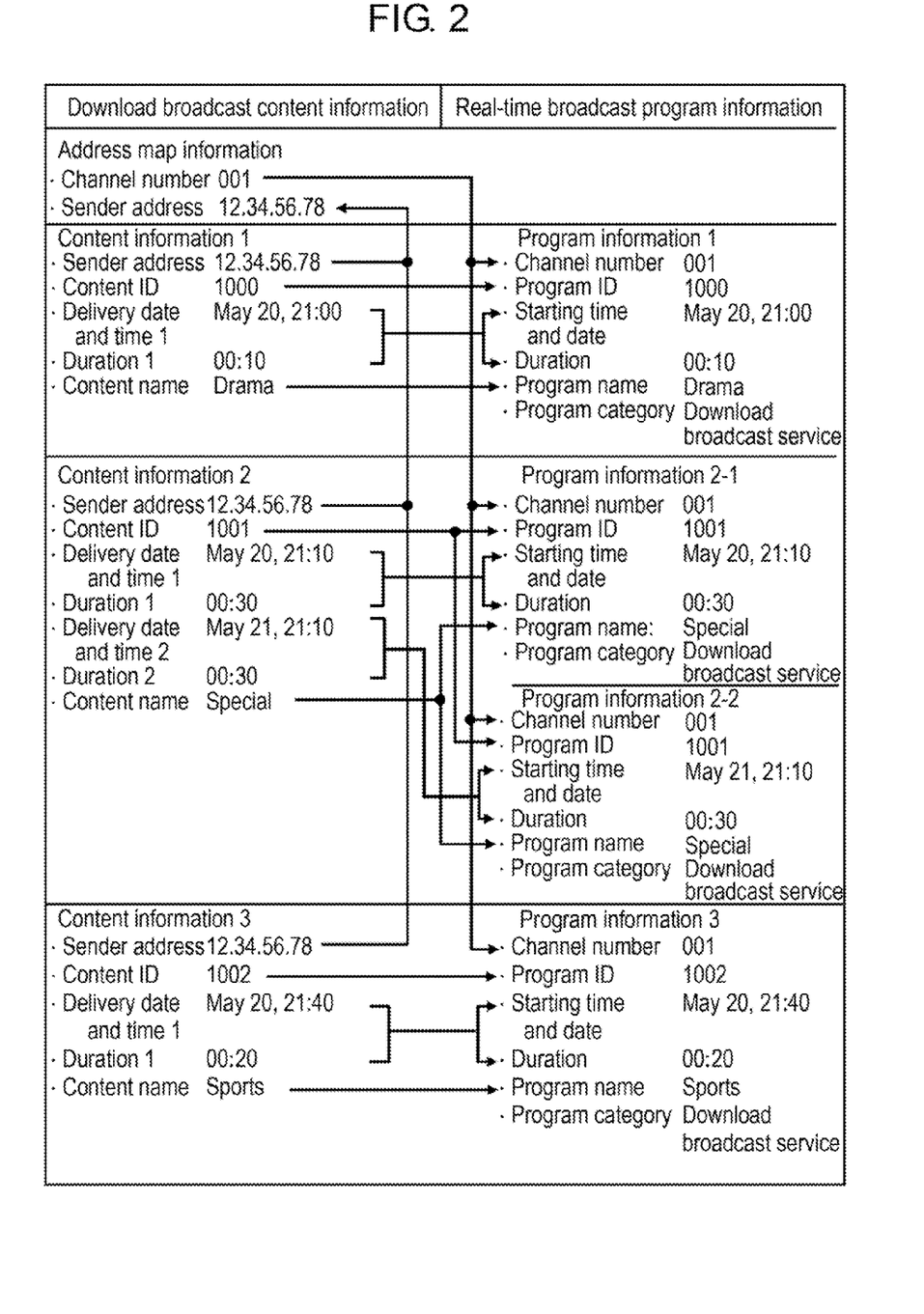
FIG. 2 shows example 1 of conversion of download broadcast content information in accordance with the first and second exemplary embodiments of the present invention.
Figure 3:
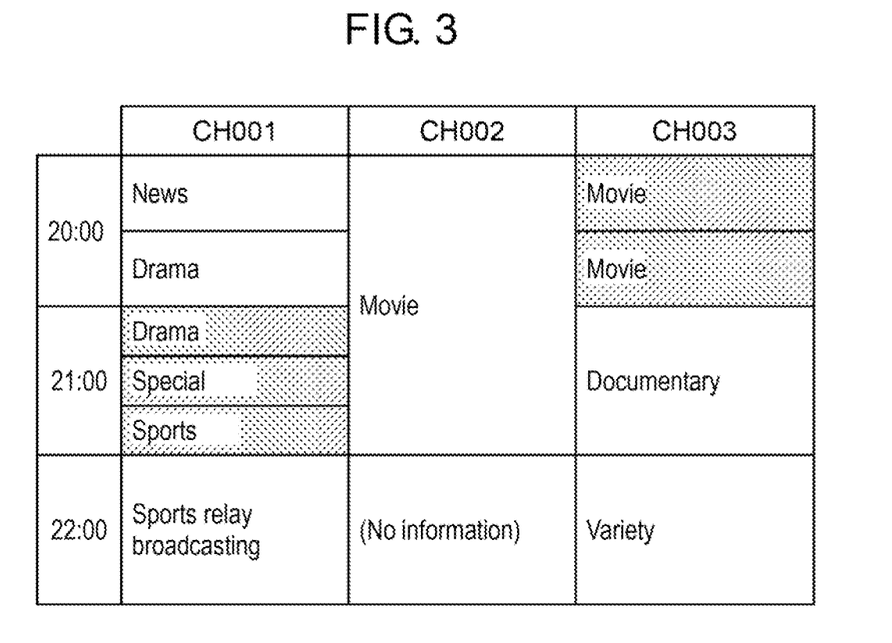
FIG. 3 shows example 1 of EPG display data in accordance with the first and second exemplary embodiments of the present invention.

An example of conversion of the download broadcast content information in digital broadcast receiver 200a is described with reference to FIGS. 2 and 3. FIG. 2 shows example 1 of conversion of download broadcast content information in accordance with the first exemplary embodiment of the present invention. FIG. 3 shows example 1 of EPG display data in accordance with the first exemplary embodiment of the present invention.

The download broadcast service uses content information that is the same as in a communication download service for download broadcast content information so that the download broadcast service is compatible with the communication download service. Therefore, the download broadcast content information includes a sender address, content ID, and a content name of each content as shown in the left part of FIG. 2. A delivery date and time, and duration are also included as information that is not included in the content information of the communication download service. As shown in content information 2 in FIG. 2, a plurality of delivery dates and times, and duration including those of rebroadcast may be described in one piece of content information. Furthermore, as information specific to the download broadcast service, address map information indicating a combination of a channel number and a sender address is also used.

Download broadcast content information converting unit 214 converts the download broadcast content information into a form of the real-time broadcast program information as shown in FIG. 2. The real-time broadcast program information includes program information indicating a channel number, program ID, starting time and date, duration, and a program name of each program as shown in the right part of FIG. 2.

Download broadcast content information converting unit 214 as the program guide generating unit converts a sender address of the download broadcast content information into a channel number of the program information based on the address map information of the download broadcast content information. Furthermore, download broadcast content information converting unit 214 generates program information from the content information so as to be converted into the real-time broadcast program information in such a manner that the content ID of the content information is converted into the program ID of the program information, the delivery date and time of the content information are converted into the starting time and date of the program information, the duration of the content information is converted into the duration of the program information, and the content name of the content information is converted into the program name of the program information. Furthermore, download broadcast content information converting unit 214 as the program guide generating unit forms a plurality of pieces of the program information whose number is the number of the delivery dates and times from one piece of the download broadcast content information when a plurality of delivery dates and times is described in the download broadcast content information, and converts them into a plurality of pieces of the real-time broadcast program information. Note here that the download broadcast content information may include the duration of the content in addition to the delivery date and time.

Furthermore, information indicating the conversion from the download broadcast content information, for example, information indicating that a program category is changed to the download broadcast service, is added. When EPG display data are formed, the time zone of the download broadcast service is visually distinguished from that of the real-time broadcast service by, for example, changing a background color. As a result, the EPG display data as shown in FIG. 3 are formed.

Figure 4:
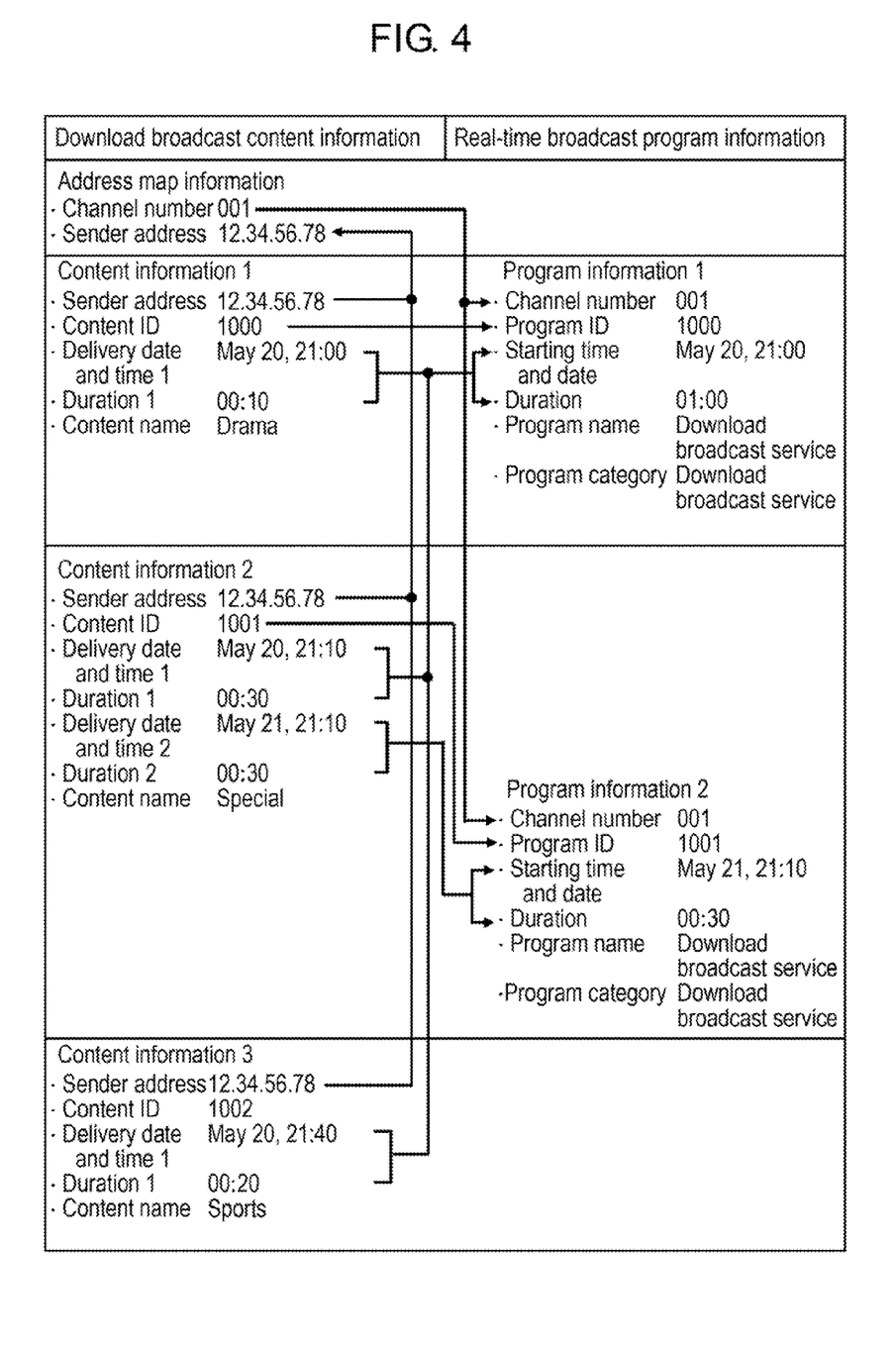
FIG. 4 shows example 2 of conversion of download broadcast content information in accordance with the first and second exemplary embodiments of the present invention.
Figure 5:
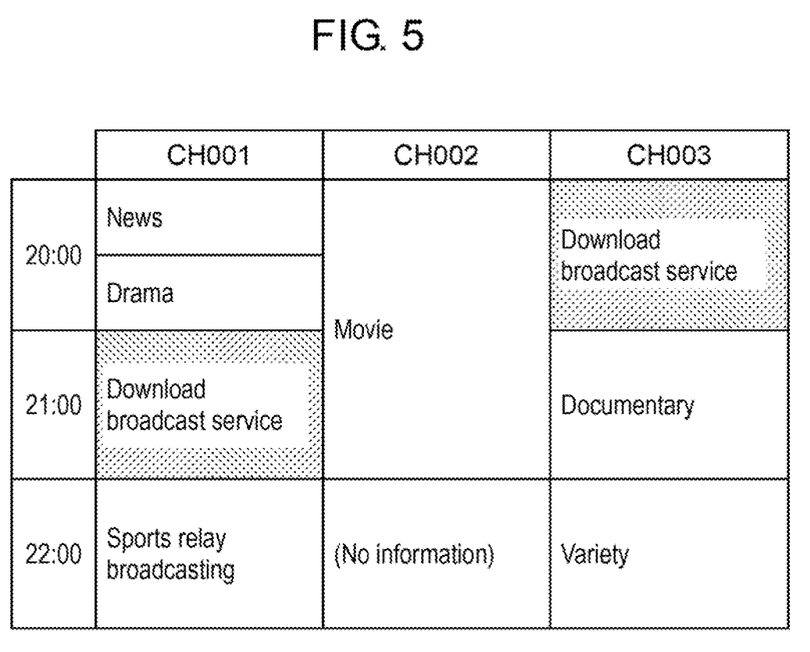
FIG. 5 shows example 2 of EPG display data in accordance with the first and second exemplary embodiments of the present invention.

Furthermore, another example is described with reference to FIGS. 4 and 5. FIG. 4 shows example 2 of conversion of download broadcast content information in accordance with the first exemplary embodiment of the present invention. FIG. 5 shows example 2 of EPG display data in accordance with the first exemplary embodiment of the present invention. Herein, unlike the above-mentioned example, as shown in FIG. 4, a plurality of pieces of the download broadcast content information that are continuous in terms of time is converted into a form of one piece of the real-time broadcast program information.

More specifically, download broadcast content information converting unit 214 as the program guide generating unit converts a sender address of the download broadcast content information into a channel number of the program information based on address map information of the download broadcast content information. Furthermore, download broadcast content information converting unit 214 converts the content ID of the top download broadcast content information among a plurality of pieces of download broadcast content information, which are continuous in terms of time, into program ID of the program information, converts the delivery date and time of the top download broadcast content information into starting time and date of the program information, total time of the duration of the plurality of pieces of the download broadcast content information, which are continuous in terms of time, into the duration of the program information. Furthermore, download broadcast content information converting unit 214 converts the program name of the program information into the download broadcast service. Furthermore, download broadcast content information converting unit 214 converts a plurality of pieces of the download broadcast content information, which are continuous in terms of time, into one real-time broadcast program information with respect to each of the delivery dates and times and the duration, when a plurality of delivery dates and times and the duration is described in the download broadcast content information. As a result, the EPG display data as shown in FIG. 5 are formed.

In this way, the digital broadcast system in accordance with the first exemplary embodiment forms the EPG display data by using the download broadcast content information obtained from transmission line 300 or communication network 400 even when the real-time broadcast service includes only real-time broadcast program information. Therefore, when download broadcast content information is present in a time zone in which no real-time broadcast program information is present, download broadcast content information can be displayed such that it is distinguished from a time zone of the real-time broadcast service. Therefore, only by allowing the EPG of the real-time broadcast service to be displayed, a viewer can distinguish among a time zone during the real-time broadcast service, a time zone during the download broadcast service, and a time zone of suspension of broadcast service.

Second Exemplary Embodiment

Figure 6:
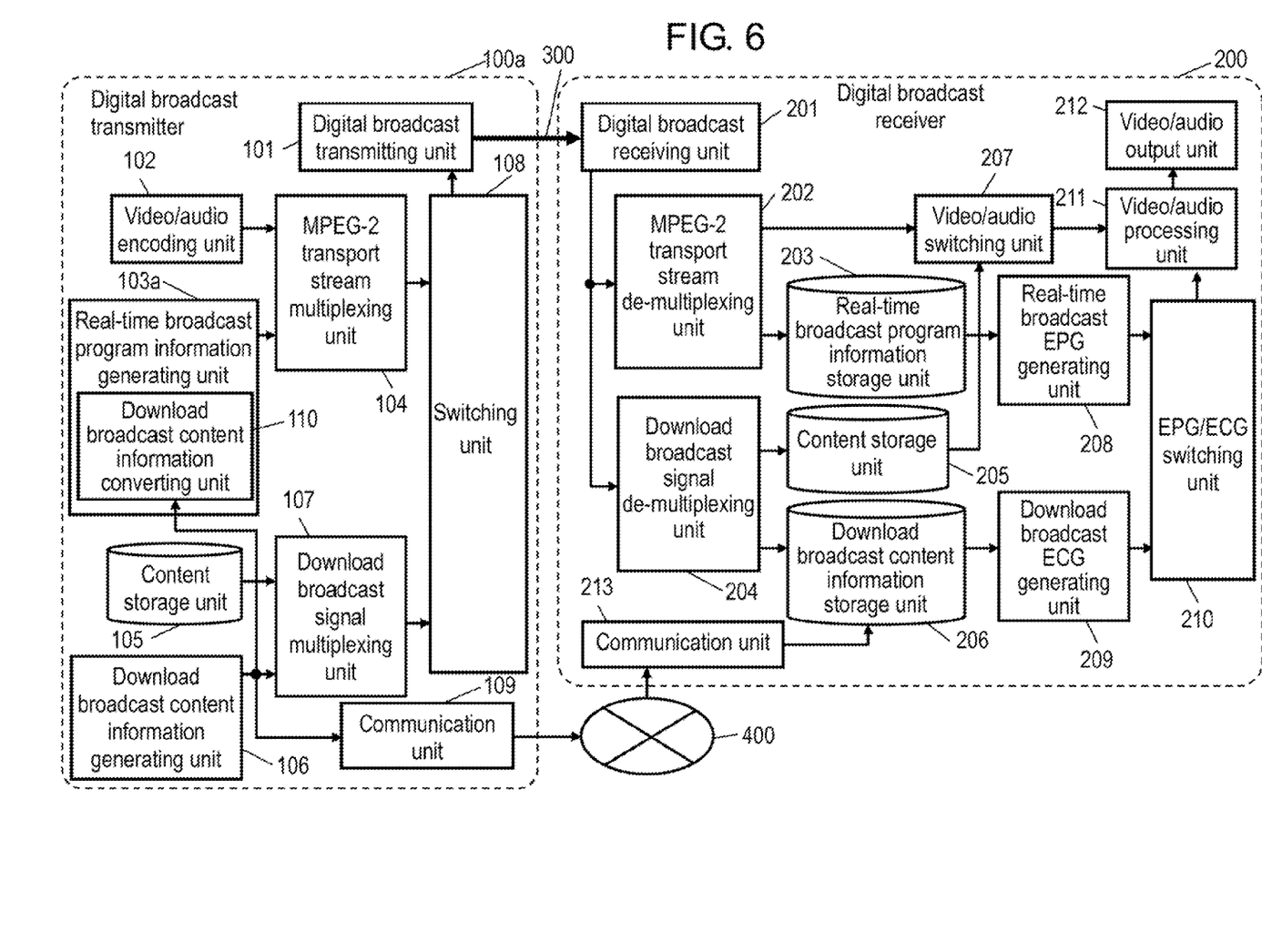
FIG. 6 is a configuration diagram of a digital broadcast system in accordance with the second exemplary embodiment of the present invention.

An outline of a digital broadcast system in accordance with a second exemplary embodiment of the present invention is described. FIG. 6 is a configuration diagram of a digital broadcast system in accordance with the second exemplary embodiment of the present invention. Digital broadcast transmitter 100a is different from digital broadcast transmitter 100 of the conventional digital broadcast system shown in FIG. 7, but digital broadcast receiver 200 is the same as digital broadcast receiver 200 of the conventional digital broadcast system shown in FIG. 7.

Digital broadcast transmitter 100a includes video/audio encoding unit 102, real-time broadcast program information generating unit 103a, a first multiplexing unit, content storage unit 105, download broadcast content information converting unit 110, a second multiplexing unit, switching unit 108, and digital broadcast transmitting unit 101.

Video/audio encoding unit 102 encodes video/audio data for the real-time broadcast service.

Download broadcast content information generating unit 106 generates download broadcast content information.

For the real-time broadcast service, in digital broadcast transmitter 100a, download broadcast content information converting unit 110 included in real-time broadcast program information generating unit 103a converts the download broadcast content information output from download broadcast content information generating unit 106 into the real-time broadcast program information. Then, real-time broadcast program information generating unit 103a synthesizes the converted real-time broadcast program information and the real-time broadcast program information, and outputs the synthesized information.

Furthermore, MPEG-2 transport stream multiplexing unit 104 as the first multiplexing unit multiplexes the video/audio data output from video/audio encoding unit 102 and the real-time broadcast program information output from real-time broadcast program information generating unit 103a in the MPEG-2SYSTEM mode. MPEG-2 transport stream multiplexing unit 104 outputs an MPEG-2 transport stream to switching unit 108.

On the other hand, for the download broadcast service, in digital broadcast transmitter 100a, download broadcast signal multiplexing unit 107 as the second multiplexing unit multiplexes the video/audio data for the download broadcast service output from content storage unit 105 and the download broadcast content information output from download broadcast content information generating unit 106 in a download broadcast signal multiplexing mode. Then, download broadcast signal multiplexing unit 107 outputs a download broadcast signal to switching unit 108.

Switching unit 108 selects a signal from the first multiplexing unit and a signal from the second multiplexing unit. That is to say, switching unit 108 selects the MPEG-2 transport stream during the real-time broadcast service, and selects the download broadcast signal during the download broadcast service. Digital broadcast transmitting unit 101 modulates the digital broadcast signal selected by switching unit 108 and outputs the modulated signal to transmission line 300.

Also, the download broadcast content information output from download broadcast content information generating unit 106 is output from communication unit 109 to communication network 400.

On the other hand, digital broadcast receiver 200 receives a digital broadcast signal flowing in transmission line 300. Digital broadcast receiving unit 201 demodulates the digital broadcast signal. Digital broadcast receiving unit 201 outputs the MPEG2 transport stream to MPEG-2 transport stream de-multiplexing unit 202 during the real-time broadcast service. Furthermore, digital broadcast receiving unit 201 outputs the download broadcast signal to download broadcast signal de-multiplexing unit 204 during the download broadcast service.

For the real-time broadcast service, MPEG-2 transport stream de-multiplexing unit 202 separates the video/audio data and the real-time broadcast program information from the MPEG-2 transport stream. The real-time broadcast program information is stored in real-time broadcast program information storage unit 203. The video/audio data pass through video/audio switching unit 207, are decoded in video/audio processing unit 211, and output from video/audio output unit 212. Thus, a viewer can view real-time broadcast.

For the download broadcast service, download broadcast signal de-multiplexing unit 204 separates the video/audio data and the download broadcast content information from the download broadcast signal. Furthermore, during the real-time broadcast service, communication unit 213 obtains the download broadcast content information flowing in communication network 400. The download broadcast content information obtained from transmission line 300 or communication network 400 is stored in download broadcast content information storage unit 206. The video/audio data are stored in content storage unit 205 only when they are programs which a viewer instructs to store. The stored video/audio data are output from content storage unit 205 when the viewer instructs them to be reproduced. The video/audio data pass through video/audio switching unit 207, are decoded in video/audio processing unit 211, and are output from video/audio output unit 212. Thus, a viewer can view real-time broadcast.

When a viewer instructs an EPG of the real-time broadcast service to be displayed, real-time broadcast EPG generating unit 208 takes out the real-time broadcast program information from real-time broadcast program information storage unit 203, forms EPG display data and output the formed data. The EPG display data pass through EPG/ECG switching unit 210, are synthesized with video data in video/audio processing unit 211, and are output from video/audio output unit 212.

Furthermore, when a viewer instructs an ECG of the download broadcast service to be displayed, download broadcast ECG generating unit 209 takes out the download broadcast content information from download broadcast content information storage unit 206, forms ECG display data, and outputs the formed data. The ECG display data pass through EPG/ECG switching unit 210, are synthesized with video data in video/audio processing unit 211, and output from video/audio output unit 212. In this case, ECG display data as shown in FIG. 10 are displayed. Therefore, it is not desirable that a time zone of the real-time broadcast service is blank when a viewer instructs the ECG of the download broadcast service to be displayed.

The conversion of the download broadcast content information in download broadcast content information converting unit 110 of digital broadcast transmitter 100*a* is the same as the conversion of the download broadcast content information in download broadcast content information converting unit 214 of digital broadcast receiver 200*a* in the first exemplary embodiment. Therefore, as described in the first exemplary embodiment, conversion of the download broadcast content information in FIG. 2 or FIG. 4 is carried out. As a result, when a viewer instructs an EPG of the real-time broadcast to be displayed, EPG display data as shown in FIG. 3 or 5 can be displayed.

In this way, in the digital broadcast system in the second exemplary embodiment, digital broadcast transmitter 100*a* converts the download broadcast content information to be broadcasted as the real-time broadcast program information. Therefore, even in a conventional digital broadcast receiver 100, since the download broadcast can be displayed such that it is distinguished from a time zone of the real-time broadcast service, only by displaying the EPG of the real-time broadcast service, a viewer can distinguish among a time zone during the real-time broadcast service, a time zone during the download broadcast service, and a time zone of suspension of broadcast service.

INDUSTRIAL APPLICABILITY

A digital broadcast receiver and a digital broadcast transmitter in accordance with the present invention display download broadcast content information such that it is distinguished from a time zone of the real-time broadcast service when the download broadcast content information is present in a time zone in which real-time broadcast program information is not present. Therefore, only by displaying a program guide of the real-time broadcast service, a viewer can distinguish among a time zone during the real-time broadcast service, a time zone during the download broadcast service, and a time zone of suspension of broadcast service. Therefore, the digital broadcast receiver and the digital broadcast transmitter in accordance with the present invention are useful as the digital broadcast receiver and the digital broadcast transmitter for simultaneously displaying program and information of content corresponding to both the real-time broadcast and the download broadcast.

REFERENCE MARKS IN DRAWINGS

100*a* digital broadcast transmitter
101 digital broadcast transmitting unit
102 video/audio encoding unit
103*a* real-time broadcast program information generating unit
104 MPEG-2 transport stream multiplexing unit (first multiplexing unit)
105 content storage unit
106 download broadcast content information generating unit
107 download broadcast signal multiplexing unit (second multiplexing unit)
108 switching unit
109 communication unit
110 download broadcast content information converting unit
200*a* digital broadcast receiver
201 digital broadcast receiving unit
202 MPEG-2 transport stream de-multiplexing unit (first de-multiplexing unit)
203 real-time broadcast program information storage unit (first storage unit)
204 download broadcast signal de-multiplexing unit (second de-multiplexing unit)
205 content storage unit
206 download broadcast content information storage unit (second storage unit)
207 video/audio switching unit
208*a* real-time broadcast EPG generating unit (program guide generating unit)
209 download broadcast ECG generating unit
210 EPG/ECG switching unit
211 video/audio processing unit
212 video/audio output unit
213 communication unit
214 download broadcast content information converting unit
300 transmission line
400 communication network

The invention claimed is:
1. A digital broadcast receiver for receiving a broadcast signal including download broadcast service and real-time broadcast service, the digital broadcast receiver comprising:

a broadcast receiver for receiving and demodulating the broadcast signal;

a first de-multiplexer for separating video/audio data and real-time broadcast program information from the real-time broadcast service when the broadcast signal carries the real-time broadcast service;

a first storage for storing the real-time broadcast program information;

a second de-multiplexer for separating video/audio data and download broadcast content information from the download broadcast service when the broadcast signal carries the download broadcast service;

a second storage for storing the download broadcast content information; and a program guide generator for converting the download broadcast content information stored in the second storage into the real-time broadcast program information, forming electronic program guide display data of the converted program information together with the real-time broadcast program information stored in the first storage, and outputting the formed program guide display data;

wherein the program guide generator converts a sender address into a channel number based on address map information of the download broadcast content information in the program display data, converts one piece of the download broadcast content information into a plurality of pieces of real-time broadcast program information, and forms a plurality of pieces of the program guide display data whose numbers are numbers of delivery dates and times described in the one piece of the download broadcast content information.

2. The digital broadcast receiver according to claim 1, wherein the program guide generator converts content ID of download broadcast content information at a top of the plurality of pieces of the download broadcast content information, which are continuous in terms of time, into program ID;

a delivery date and time of the download broadcast content information at the top into a starting date and time;

total time of duration of the plurality of pieces of the download broadcast content information, which are continuous in terms of time, into duration;

a program name of program information into the download broadcast service; and a plurality of pieces of the download broadcast content information, which are continuous in terms of time, into one piece of real-time broadcast program information with respect to a plurality of delivery dates and times and duration when the plurality of delivery dates and times and duration is described in the download broadcast content information.

3. A digital broadcast transmitter for transmitting a broadcast signal including download broadcast service and real-time broadcast service, the digital broadcast transmitter comprising:

a video/audio encoder for encoding video/audio data for the real-time broadcast service;

a real-time broadcast program information generator for generating real-time broadcast program information;

a first multiplexer for multiplexing the video/audio data for the real-time broadcast service and the real-time broadcast program information;

a content storage for storing video/audio data for the download broadcast service;

a download broadcast content information generator for generating download broadcast content information;

a second multiplexer for multiplexing the video/audio data for the download broadcast service and the download broadcast content information;

a switch for selecting a signal from the first multiplexer and a signal from the second multiplexer; and a digital broadcast transmitter for modulating the signal selected by the switch and outputting the modulated signal, wherein the real-time broadcast program information generator converts the download broadcast content information from the download broadcast content information generator into the real-time broadcast program information, wherein the real-time broadcast program information generator converts a sender address into a channel number based on address map information of the download broadcast content information, and when a plurality of delivery dates and times is described in the download broadcast content information, the real-time broadcast program information generator converts one piece of the download broadcast content information into a plurality of pieces of the real-time broadcast program information whose numbers are numbers of the delivery dates and times from the one piece of the download broadcast content information, and the real-time broadcast program information generator synthesizes the converted real-time broadcast program information and the real-time broadcast program information.

4. The digital broadcast transmitter according to claim 3, wherein the real-time broadcast program information generator converts content ID of download broadcast content information at a top of the plurality of pieces of the download broadcast content information, which are continuous in terms of time, into program ID;

a delivery date and time of the download broadcast content information at the top into a starting date and time;

total time of duration of the plurality of pieces of the download broadcast content information, which are continuous in terms of time, into duration;

a program name of program information into the download broadcast service; and a plurality of pieces of the download broadcast content information, which are continuous in terms of time, into one piece of real-time broadcast program information with respect to a plurality of delivery dates and times and duration when the plurality of delivery dates and times and duration is described in the download broadcast content information.

* * * * *